United States Patent
Mademann

(10) Patent No.: US 6,185,196 B1
(45) Date of Patent: Feb. 6, 2001

(54) METHOD FOR TRANSMITTING DATA PACKETS ACCORDING TO A PACKET DATA SERVICE IN A CELLULAR MOBILE RADIO NETWORK PROVIDED FOR VOICE AND DATA TRANSMISSION

(75) Inventor: Frank Mademann, Strausberg (DE)

(73) Assignee: Siemens Aktiengesellschaft, Munich (DE)

(*) Notice: Under 35 U.S.C. 154(b), the term of this patent shall be extended for 0 days.

(21) Appl. No.: 08/981,395

(22) PCT Filed: Jun. 25, 1996

(86) PCT No.: PCT/DE96/01118

§ 371 Date: Dec. 18, 1997

§ 102(e) Date: Dec. 18, 1997

(87) PCT Pub. No.: WO97/02712

PCT Pub. Date: Jan. 23, 1997

(30) Foreign Application Priority Data

Jul. 6, 1995 (DE) .............................. 195 24 659

(51) Int. Cl.[7] .................. H04Q 7/22; H04Q 7/24
(52) U.S. Cl. .................... 370/327; 370/340; 370/341
(58) Field of Search ................... 370/327, 340, 370/341

(56) References Cited

U.S. PATENT DOCUMENTS 6,052,369 * 4/2000 Hamalainen et al. .............. 370/389

FOREIGN PATENT DOCUMENTS 0 642 283 A2 3/1995 (EP) .
WO 95/16330 6/1995 (WO) .
WO 95/21508 8/1995 (WO) .

OTHER PUBLICATIONS

Bianchi, G. et al., 'Packet Data Service over GSM Networks with Dynamic Stealing of Voice Channels', Global Telecommunications Conference, GLOBECOM'95, IEEE, pp. 1152–1156, Nov. 1995.*

ISS, World Telecommunication Congress, Berlin, Frank Mademann, General Packet Radio Service—A Packet Mode Service Within the GSM, pp. 36–40, Apr. 1995.

* cited by examiner

*Primary Examiner*—Melvin Marcelo
(74) *Attorney, Agent, or Firm*—Schiff Hardin & Waite

(57) ABSTRACT

In order to transmit data packets for a packet data service in a cellular mobile radio network, in each case one channel (TCH) in the radio transmission system (BSS) of the mobile radio network is reserved and linked to a transmission channel (NUC), which leads to a separate service network node (GSN), to form a continuous data channel. Data packets and signalling information are transmitted jointly via the data channel in a single data protocol between the mobile subscriber station (MS) and the service network node (GSN). In this way, signalling information and data packets are transmitted in only one protocol, to be precise the data protocol. By using only the data protocol for the joint transmission of the data packets and signalling information, there is a reduction in the signalling load and the channel seizure duration in the mobile radio network in comparison with the solution with two separate protocols for signalling and data.

9 Claims, 2 Drawing Sheets

METHOD FOR TRANSMITTING DATA PACKETS ACCORDING TO A PACKET DATA SERVICE IN A CELLULAR MOBILE RADIO NETWORK PROVIDED FOR VOICE AND DATA TRANSMISSION

BACKGROUND OF THE INVENTION

Field of the Invention

The invention relates to a method for transmitting data packets according to a packet data service in a cellular mobile radio network provided for voice and data transmission.

International application WO 95/16330 discloses a plurality of devices and a mobile station for transmitting data packets, which devices permit optimized transmission of the data packets by setting up logic packet data channels. The data packet-specific devices are implemented entirely or partially in the components of a GSM mobile radio system. The data packets are transmitted from and to the mobile station on the packet data channels by using specific packet data protocols.

European patent EP 0 642 283 discloses a mobile radio system in which, in order to reduce the costs for the subscriber with respect to the transmission of data packets in the mobile radio system, a virtual channel is set up by exchanging and storing parameters in a mobile station and a fixed station, which channel permits a rapid setup of a real data communication channel and is maintained during the transmission pauses of the data packets in order to speed up the restoration of the real data communication channel.

In cellular mobile radio networks, such as the GSM mobile radio network (Global System for Mobile Communication), for example, for voice and data transmission, an excessively high signalling load occurs in the case of brief data transmissions. As a rule, a signalling protocol, which ensures there is an exchange of subscriber-specific and network-related information, is initially set up for the transmission of data. A dedicated channel is made available for the transmission of signalling information. After the signalling protocol, a data protocol for the transmission of useful data is set up, in which case a database inquiry can also be intermediately connected in advance while the channel is seized.

SUMMARY OF THE INVENTION

The object of the present invention is to specify a method of the type mentioned at the beginning by means of which the signalling load during the transmission of data packets can be reduced in the mobile radio network and the channels can be utilized more efficiently.

In order to transmit at least one data packet from or to a mobile subscriber station, in each case one channel is reserved in the radio transmission system of the mobile radio network and is linked to a transmission channel, which leads to a separate service network node, to form a continuous data channel.

Data packets and signalling information are transmitted jointly via the data channel in a single data protocol between the mobile subscriber station and the service network node. In this way, signalling information and data packets are transmitted in only one protocol, to be precise the data protocol. Since the data protocol is more complex than a signalling protocol, it is particularly suitable for the additional transmission of signalling information. A signalling protocol alone would not have the data throughput rate for the additional transmission of data packets. When the packet data service is requested, the one data protocol can be used to quickly seize an unseized radio channel in the radio transmission system of the mobile radio network and to release it again, which brings about more efficient use of the radio channels. It is not necessary to reserve any dedicated radio channels for the data packets and signalling information to be transmitted within the scope of the packet data service, since the customary radio channels which are provided for voice and data transmission are assigned to packet transmission when necessary. By using a single data protocol for the joint transmission of data packets and signalling information, the signalling load and the radio channel seizure duration in the mobile radio network are reduced in comparison with the solution with two separate protocols for signalling and for data.

According to one development of the invention, subscriber-specific and/or network-related signalling information is transmitted in the data protocol. The signalling information may comprise authentification, identification, localization, encryption or data service information.

It is advantageous if the signalling information is transmitted in the first part of the data protocol and the data packets are transmitted after the signalling information.

It is also advantageous if the service network node is arranged in a mobile switching center or in addition to a mobile switching center of the switching system or in the radio transmission system of the mobile radio network.

It is advantageous if the service network node checks the access authorization of a mobile radio subscriber to the mobile radio network actually during or after reception of the data packets.

According to another development of the invention, the data packets and the signalling information are transmitted in the data protocol either from the mobile subscriber station to the service network node or in the opposite direction from the service network node to the mobile subscriber station.

BRIEF DESCRIPTION OF THE DRAWINGS

The features of the present invention which are believed to be novel, are set forth with particularity in the appended claims. The invention, together with further objects and advantages, may best be understood by reference to the following description taken in 20 conjunction with the accompanying drawings, in the several Figures of which like reference numerals identify like elements, and in which:

DESCRIPTION OF THE PREFERRED EMBODIMENTS

Figure 1:
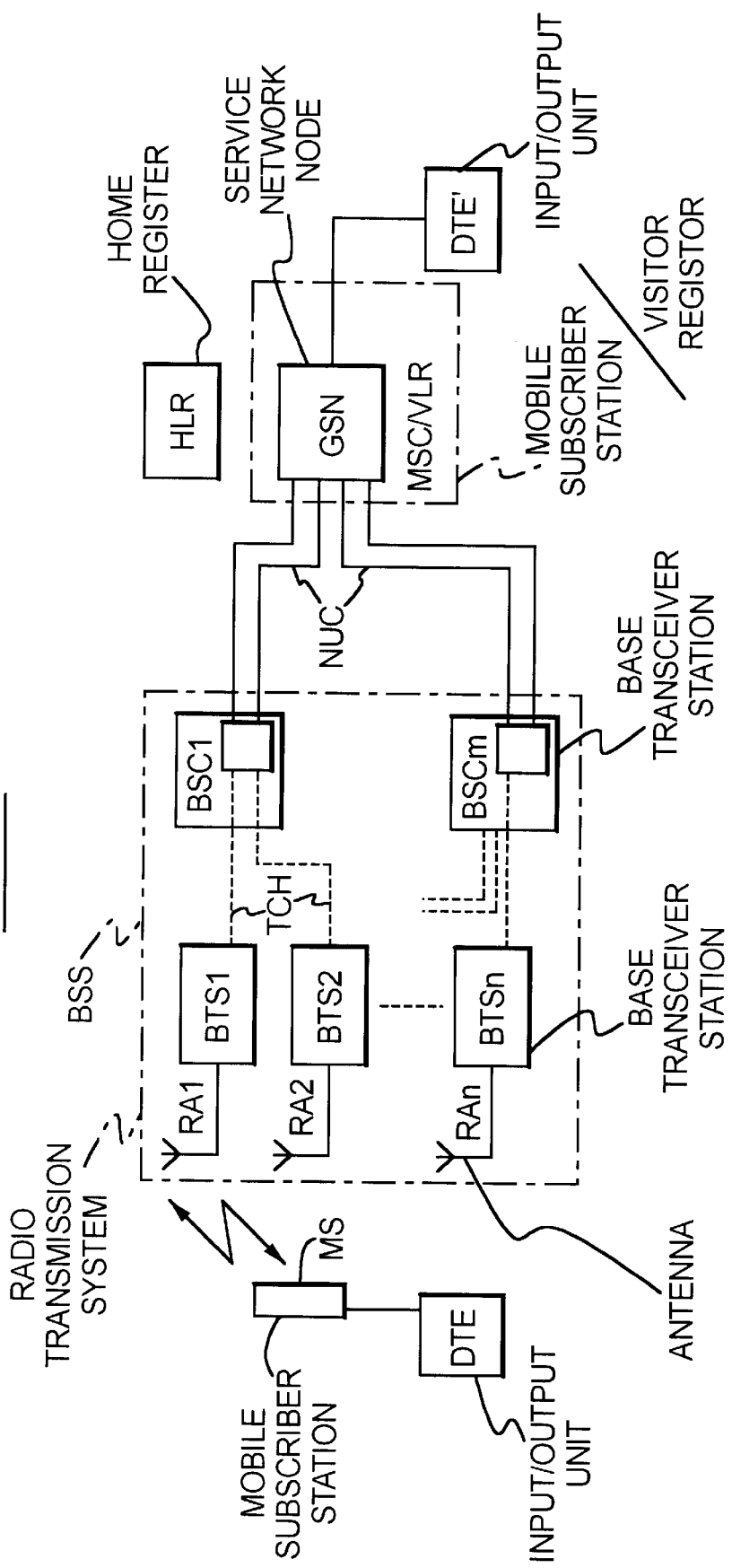
FIG. 1 shows the devices of a mobile radio network for transmitting data packets according to a packet data service and FIG. 2 shows the signal flowchart between the devices during the transmission of data packets.

FIG. 1 shows devices of a cellular digital mobile radio network according to the GSM Standard for voice and data transmission. By means of a uniform air interface for wireless connection of mobile subscriber stations MS to a radio transmission system BSS, mobile radio subscribers in the mobile radio network can make incoming and outgoing calls or transmit and receive data. A switching system is connected using the radio transmission system BSS to, as a rule, a plurality of mobile switching centers MSC and associated visitor registers VLR. The visitor register VLR temporarily stores, as a decentralized subscriber database, the subscriber data of the mobile radio subscribers who are currently in a location area served by the respective mobile switching center MSC. The subscriber data of all the mobile radio subscribers registered in the mobile radio network are stored in at least one central subscriber database—the home register ELR. The mobile switching centers MSC, the visitor registers VLR and the home register or registers HLR are components here of the switching system in the mobile radio network.

The radio transmission system BSS has base transceiver stations BTS1, BTS2 . . . BTSn with associated antennas RA1, RA2 . . . RAn for transmitting and receiving the voice or data signals. The transmission of signals between the mobile subscriber station MS and a base transceiver station which is pertinent owing to the location of the mobile radio subscriber takes place in a wireless fashion via the air interface. A plurality of base transceiver stations BTS1 . . . are connected in each case to a base station controller BSC1 . . . BSCm—in the present example via fixed lines. The base transceiver stations BTS1 and BTS2 are connected to the base station controller BSC1, while the base transceiver station BTSn is connected to the base station controller BSCm. The base station controllers BSC1 . . . of the radio transmission system BSS are themselves connected via wire-bound lines, microwave radio links, optical fiber cables or other transmission means to the switching system and the mobile switching centers MSC arranged in them.

In order to use a packet data service (GPRS, General Packet Radio Service), one or more data packets are exchanged in both transmission directions between the mobile subscriber station MS and a separate service network node GSN in the mobile radio network. In order to input or output the data packets, a data input and data output unit DTE is connected to the mobile subscriber station MS. Likewise, a data input and data output unit DTE'is connected to the separate service network node GSN, it being possible to intermediately connect additional devices (protocol router) for switching through the data packets from the separate service network node GSN to the data input and data output unit DTE'and for controlling an appropriate data protocol. In order to transmit the data packets according to the packet data service, in each case a radio channel TCH is reserved in the radio transmission system BSS. Initially, a channel inquiry is transmitted from the mobile subscriber station MS to the pertinent base transceiver station—for example the base transceiver station BTS1—and from there to the base station controller, e.g. BSC1. The base station controller BSC1 subsequently assigns the radio channel TCH to the mobile subscriber station MS and links the radio channel TCH to a transmission channel NUC, which in the example leads to one of the connecting lines from the base station controller BSC1 to the separate service network node GSN. In the event that the service network node is located in the radio transmission system BSS, the connecting line is omitted and the transmission channel to the service network node is connected to the radio channel within the radio transmission system BSS.

In this way, a data channel is produced which is continuous from the mobile subscriber station MS to the service network node MTS and via which the data packets can be transmitted with, for example, a data rate of 9600 bit/s. According to the invention, the signalling information is also transmitted together with the data packets via the continuous data channel in one data protocol between the mobile subscriber station MS and the separate service network node GSN. By using only one transmission protocol for exchanging subscriber-specific and/or network-related signalling information and for exchanging data packets, there is a reduction in not only the signalling load but also the radio channel seizure duration in the cellular mobile radio network. Preferably, the data packets are transmitted and received in the data protocol immediately after the signalling information. The transmitted data packets are, if necessary, buffered until the further transmission is allowed or processing of the data packets, for example in the form of encryption and/or decryption, has taken place.

The separate service network node GSN for processing the packet data service in the cellular mobile radio network is in the present example a component of the mobile switching center MSC. It is possible as an alternative to arrange the service network node in the radio transmission system BSS or in addition to the mobile switching centers MSC of the switching system. The transmission channels NUC between the base station controllers BSC1 . . . and the service network node GSN permit various radio channels TCH to be quickly connected into the system, said radio channels TCH being reserved for a mobile radio subscriber in each case for the duration of the transmission of the data packets and of the signalling information. The radio channel TCH is therefore seized only for the duration of a transfer of data packet and signalling information. In order to use the packet data service, radio channels do not need to be reserved especially, since the customary transmission channels provided for voice and data signals and the existing subscriber databases HLR, VLR are used. Furthermore, for transmitting data for the packet data service, use is made of the addressing methods which already exist in the mobile radio network—with the international mobile radio subscriber identification number (IMSI) or another mobile radio subscriber number (e.g. MSISDN) and the temporary mobile radio subscriber identification number (TMSI)—as well as the control and administration functions (mobility management) tailored to the mobility of the subscribers.

A further advantage of the joint transmission of data packets and signalling information in the data protocol consists in the fact that the checking of the access authorization of the mobile radio subscriber to the mobile radio network is carried out after the transmission of the data packets and signalling information from the mobile subscriber station MS to the service network node GSN, so that the radio channel is not seized during administrative processes. By transmitting the international or the temporary mobile radio subscriber identification number in the signalling information, the service network node GSN can produce a reference to the subscriber data stored in the subscriber databases. As a result, there is no need for channel-specific or packetspecific signalling between the radio transmission'system BSS and the respective mobile switching center MSC.

In the event that the separate service network node for processing the packet data service is located in the switching system of the mobile radio network, the radio transmission system BSS is hardly affected by the packet data service, which brings about a reduction in the costs of implementing the service in the mobile radio network. The signalling information which is transmitted in the data protocol, preferably before the data packets, comprises authentification information, identification information, localization information, data service information or information for the encryption of the data packets. Thus, the signalling information can be subscriber-specific or network-related information. A connectionless network protocol, for example the ICO CLNP (Connectionless Network Protocol) which supports the reduction in the traffic load in the mobile radio network, is used as data protocol between the mobile subscriber station MS and the separate service network node GSN.

Figure 2:
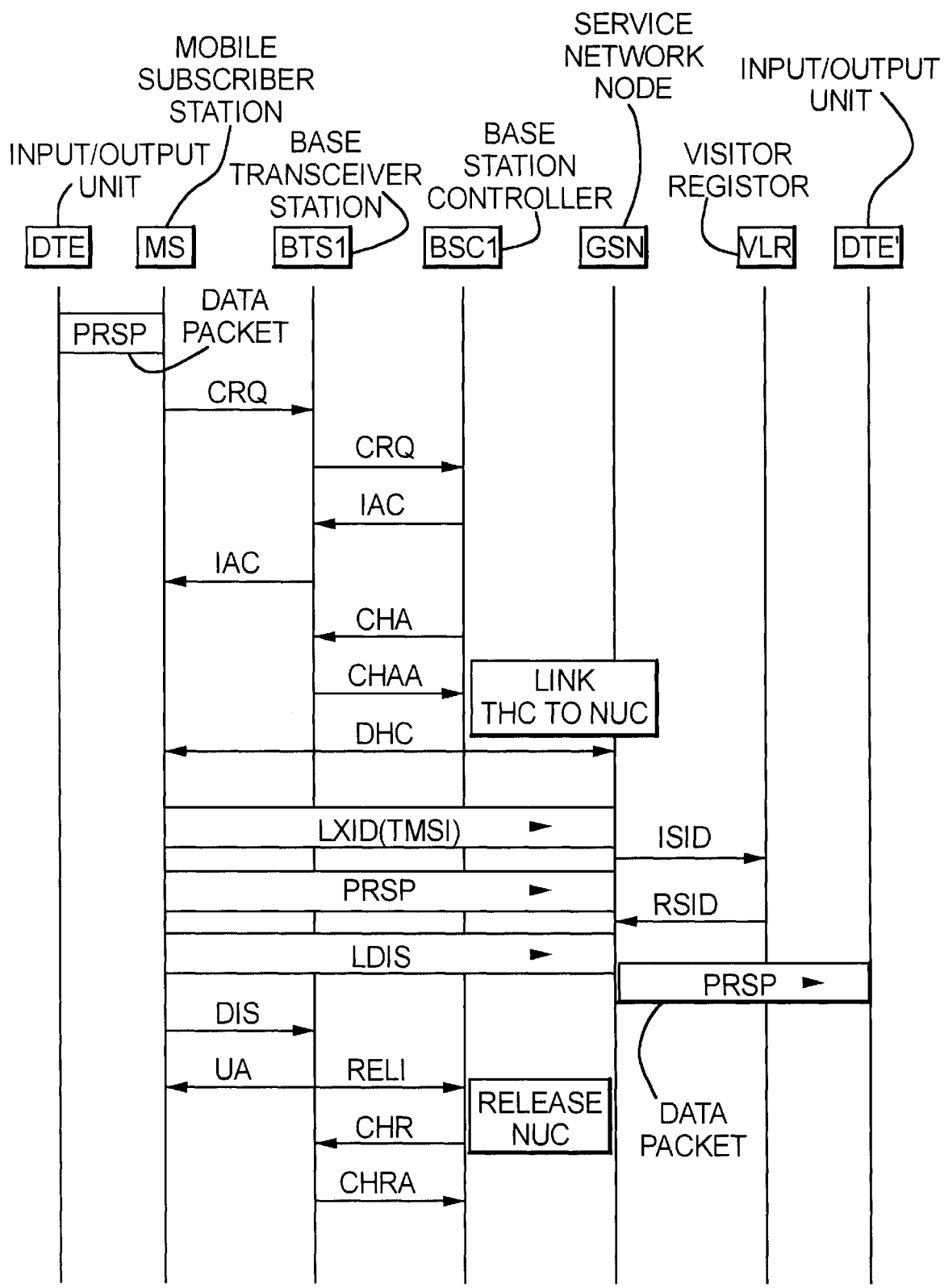

FIG. 2 shows the signal flow between the devices illustrated in FIG. 1 during the transmission of the data packets according to the packet data service in the cellular mobile radio network. The signal flow applies to the case in which data packets are transmitted within the scope of the packet data service from the data input unit DTE to the mobile subscriber station MS, from it to the separate service network node GSN and from the latter to the data output unit DTE', which is arranged in another communication network, for example a line-bound fixed network. The mobile subscriber station MS receives at least one data packet PRSP from the data input unit DTE and initiates the setting up of a radio channel to the base station controller BSC1 by transmitting a channel inquiry CRQ to the pertinent base transceiver station BTS1 on a random access channel. The channel inquiry CRQ provided with a code for the packet data service is passed on from the base transceiver station BTS1 to the base station controller BSC1. The base station controller BSC1 subsequently assigns a radio channel by means of an assignment message IAC, which is transmitted to the base transceiver station BTS1 and from there to the mobile subscriber station MS.

In the radio transmission system, a channel which is connected to the radio channel is seized between the base station controller BSC1 and the base transceiver station BTS1 by means of the messages CHA and CAAA. The radio channel TCH is connected by the base station controller BSC1 to the transmission channel NUC which leads to the service network node GSN. In this way, a continuous data channel DCH is produced between the mobile subscriber station MS and the service network node GSN as a result of the linking of the radio channel TCH to the transmission channel NUC. After the data channel DCH between the mobile subscriber station MS and service network node GSN has been synchronized, signalling information, such as the temporary mobile radio subscriber identification number TMSI for example, is transmitted in a first protocol element LXID of the data protocol and the data packets PRSP are transmitted subsequent to that. In a protocol element LDIS of the data protocol, said element following the data packets PRSP, the transfer of the data packets and of the signalling information is triggered.

After the reception of the temporary mobile radio subscriber identification number TMSI in the protocol element LXID, using the message ISID the service network node GSN requests from the visitor register VLR the international mobile radio subscriber identification number (IMSI), an item of encryption information (cipher key), as well as the access authorization of the subscriber to the network. The requested information is made available by the visitor register VLR and is transmitted back with the message RSID. The message RSID with the requested information is received by the service network node GSN, for example after the data packets PRSP have arrived. The data packets PRSP which are received by the service network node GSN are then transmitted to the data output unit DTE', a special data protocol being used for the data transmission in the fixed network. In order to protect the data packets to be transmitted, the data protection protocol RLP (Radio Link Protocol) is used in the mobile radio network and the data protection protocol HDLC (High Level Data Link Control) is used in the fixed network.

The mobile subscriber station MS transmits a message DIS to the base transceiver station BTS1 with which the release of the data channel set up between the mobile subscriber station MS and the service network node GSN is to be brought about. The base transceiver station BTS1 subsequently transmits a confirmation message UA to the mobile subscriber station MT and a message RELI to the base station controller BSC1 to disconnect the radio channel in the radio transmission system. The base station controller BSC1 releases the transmission channel NUC to the service network node GSN and transmits a message CHR to the base transceiver station BTS1, which message requests the release of the channel between the base transceiver station BTS1 and the base station controller BSC1. The response which the base station controller BSC1 receives from the base transceiver station BTS1 is a confirmation message CHRA indicating that the release message has been received.

The features of the method according to the invention can, as when transferring the data packets, be applied in the opposite transmission direction, i.e. from the data input unit DTE' in the fixed network via the service network node GSN to the mobile subscriber station MS and to the data output unit DTE in the mobile radio network. In this case, the mobile subscriber station MS in the data protocol receives the data packets and the signalling information from the separate service network node GSN. After the arrival of at least one data packet in the service network node GSN, the visitor register VLR is interrogated and then a paging call is triggered. The subsequent signalling sequence and the data packet transmission take place in the same way as in the case illustrated in FIG. 2 in that data packets are transmitted by the mobile subscriber station MS. In addition to the devices (illustrated in FIG. 1), separate through-switching devices (routing database, gateway router) each with an interface to the home register HLR and an interface to the protocol router in the case of data transmission from the service network node GSN to the mobile subscriber station MS may be arranged in the mobile radio network.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for transmitting data packets according to a packet data service in a cellular mobile radio network which is provided for voice and data transmission comprising the steps of:

setting up a channel for transmitting at least one data packet from or to a mobile subscriber station in the radio transmission system of the mobile radio network linking the channel to a transmission channel, which leads to a separate service network node, to form a data channel; and jointly transmitting the at least one data packet and signalling information via the data channel in one data protocol between the mobile subscriber station and the separate service network node.

2. The method as claimed in claim 1, wherein at least one of subscriber-specific and network-related signalling information is transmitted in the data protocol.

3. The method as claimed in claim 1, wherein one of authentification, identification, localization, encryption or data service information is transmitted in the data protocol.

4. The method as claimed in claim 1, wherein firstly the signalling information and then the data packets are transmitted in the data protocol.

5. The method as claimed in claim 1, wherein the separate service network node is provided in a mobile switching center or in addition to a mobile switching center of a switching system in the mobile radio network.

6. The method as claimed in claim 1, wherein the separate service network node is located in the radio transmission system of the mobile radio network.

7. The method as claimed in claim 1, wherein the separate service network node checks access authorization of a mobile radio subscriber during one of before reception or after reception of the data packets.

8. The method as claimed in claim 1, wherein the data packets and signalling information are transmitted in the data protocol from the mobile subscriber station to the separate service network node via the continuous data channel.

9. The method as claimed in claim 1, wherein the data packets and signalling information are transmitted from the mobile subscriber station to the separate service network node via the continuous data channel.

* * * * *